US009345913B2

(12) United States Patent
Rittner et al.

(10) Patent No.: US 9,345,913 B2
(45) Date of Patent: May 24, 2016

(54) OXYGEN BREATHING DEVICE WITH ELONGATED SUPPLY TIME

(75) Inventors: Wolfgang Rittner, Ahrensbok (DE); Rudiger Meckes, Berkenthin (DE); Gunter Boomgaarden, Scharbeutz (DE); Mark Niedostatek, Wenzendorf (DE)

(73) Assignee: Zodiac Aerotechnics, Plaisir (FR)

( * ) Notice: Subject to any disclaimer, the term of this patent is extended or adjusted under 35 U.S.C. 154(b) by 307 days.

(21) Appl. No.: 13/404,115

(22) Filed: Feb. 24, 2012

(65) Prior Publication Data
US 2013/0220317 A1 Aug. 29, 2013

(51) Int. Cl.
A62B 7/14 (2006.01)
A62B 7/08 (2006.01)
B64D 11/00 (2006.01)

(52) U.S. Cl.
CPC ... *A62B 7/14* (2013.01); *A62B 7/08* (2013.01); *B64D 11/00* (2013.01); *B64D 2231/02* (2013.01); *Y02T 50/46* (2013.01)

(58) Field of Classification Search
CPC .......... A62B 7/14; A62B 7/08; A62B 25/005; B64D 2231/025; B64D 2231/02; B64D 2013/0677; B64D 2013/0681
USPC ............. 128/202.11, 202.26, 204.18, 204.21, 128/205.13, 205.15, 205.17, 205.24
See application file for complete search history.

(56) References Cited

U.S. PATENT DOCUMENTS

| | | | | |
|---|---|---|---|---|
| 4,209,491 | A * | 6/1980 | Rich, III | 422/110 |
| 5,653,226 | A * | 8/1997 | Heyer et al. | 128/202.26 |
| 7,082,946 | B2 * | 8/2006 | Farin et al. | 128/205.25 |
| 2003/0131850 | A1 | 7/2003 | Pietrantoni | |
| 2007/0144597 | A1 * | 6/2007 | Cazenave et al. | 137/899.2 |
| 2009/0260631 | A1 * | 10/2009 | Aubonnet et al. | 128/205.25 |
| 2010/0012123 | A1 * | 1/2010 | Rittner et al. | 128/204.21 |
| 2010/0012125 | A1 * | 1/2010 | Rittner et al. | 128/205.12 |
| 2011/0000490 | A1 * | 1/2011 | Gillotin et al. | 128/204.26 |

FOREIGN PATENT DOCUMENTS

| | | |
|---|---|---|
| EP | 2090335 | 8/2009 |
| EP | 2127699 | 12/2009 |
| EP | 2143469 | 1/2010 |

OTHER PUBLICATIONS

European Search Report for EP 12156813.3 dated Jul. 11, 2012.

* cited by examiner

*Primary Examiner* — Valerie L Skorupa
*Assistant Examiner* — Douglas Sul
(74) *Attorney, Agent, or Firm* — Kilpatrick Townsend & Stockton LLP; Dean W. Russell

(57) ABSTRACT

Detailed is an aircraft oxygen emergency device including a chemical oxygen generator, an oxygen supply line including a first line section connecting the chemical oxygen generator with a flow regulator unit, and a second line section connecting the flow regulator unit with at least one oxygen mask for supplying oxygen to a mouth or a nose (or both) of a person at a breathing pressure.

17 Claims, 4 Drawing Sheets

OXYGEN BREATHING DEVICE WITH ELONGATED SUPPLY TIME

FIELD OF THE INVENTION

The invention relates to an aircraft oxygen emergency device comprising a chemical oxygen generator, an oxygen supply line including a first line section connecting said chemical oxygen generator with a flow regulator unit and a second line section connecting said flow regulator unit with at least one oxygen mask for supplying oxygen to mouth and/or nose of a person at a breathing pressure.

BACKGROUND OF THE INVENTION

Such aircraft oxygen emergency device are used to supply oxygen to passenger or cabin crew of an aircraft in an emergency situation like a decompression situation or smoke or generally reduced oxygen content or toxic content in the air inside an aircraft cabin. The oxygen emergency device must be capable of supplying oxygen to a single or a plurality of person immediately upon occurrence of such an emergency situation and over a time period which is sufficient to reach an airport and to evacuate the passenger.

Generally, a person will require a higher delivery rate of oxygen to be supplied in case of a decompression situation at a high flight altitude level than at a low flight altitude level. Thus, aircraft seek to descent in such a decompression situation in order to relieve the low pressure stress onto the passenger and to elongate the supply of oxygen. However, in specific situations, i.e. in case that mountains are to be passed such descent may not be possible.

Oxygen emergency devices are to be configured to supply oxygen in a sufficient delivery rate to a person for any flight level. It is known to store oxygen in a pressure tank to allow exact regulation and control of the delivery rate of the oxygen. However, such storage in a pressure tank has shown to be cost intensive as the sealing of such pressure tank must be under maintenance to always ensure the pressure tank to be filled completely. Still further, pressure tank have shown to add significant weight to such emergency oxygen systems.

A preferred way of storing oxygen is a chemical oxygen generator, wherein oxygen is stored in a chemically bound configuration and is produced in a chemical reaction upon a starting action like an ignition or the like. Such chemical oxygen generators can be designed to supply oxygen in different delivery rates but it is usually required to configure the chemical oxygen generators in such a way that a sufficient delivery rate is ensured for supply of oxygen to a passenger under conditions of a decompression event in a high flight altitude at a low temperature. Whereas in such specific emergency situation the chemical oxygen generator may provide exactly the delivery rate required by the passenger supplied with the oxygen a drawback of such configuration lies in the fact that far to much oxygen is generated in the chemical oxygen generator as soon as the aircraft has finalized its descent to continue on a low altitude flight level and/or a higher temperature in the cabin accelerates the chemical reaction. Thus, excess oxygen must be blown off in the environment and can not be consumed by the passenger and further increases the danger of feeding a fire within the cabin.

To overcome this drawback it is known from EP 2127699 A1 to provide an oxygen buffer for storing such excess oxygen generated in a chemical oxygen generator. The oxygen buffer is provided with oxygen via a spring biased check valve and can deliver the stored oxygen in a later phase of the process to elongate the supply time. A flow control valve is provided in the oxygen supply line to provide oxygen to the passenger at a predetermined pressure at a predetermined pressure level. This flow control valve is actuated by a control unit. Whereas this prior art arrangement has shown to significantly increase the time period during which oxygen can be supplied to a passenger the system at the same time increases the number of sealings and the weight of the whole emergency oxygen device. There is a need for more lightweight oxygen systems which however are capable of providing oxygen to a passenger for a long period of time at any flight level in a decompression situation.

SUMMARY OF THE INVENTION

The object of the invention is to satisfy this need for a lightweight and safe oxygen breathing device having a sufficient capability for delivering oxygen.

This object is fulfilled by an oxygen breathing device as explained in the introductory portion which is characterized by an oxygen supply line including a first line section connecting said chemical oxygen generator with a flow regulator unit and a second line section connecting said flow regulator unit with at least one oxygen mask for supplying oxygen to mouth and/or nose of a person at a breathing pressure, setup second line section comprises an upstream second line section connecting said flow regulator unit with a throttle unit and a downstream second line section connecting said throttle unit with the oxygen mask, wherein oxygen flowing from the chemical oxygen generator to the oxygen mask via said oxygen supply line passes through said throttle unit and said throttle unit has a cross section which is small enough to increase the pressure within the chemical oxygen generator, the first line section, the flow regulator unit and the upstream second line section to an elevated pressure above said breathing pressure.

According to the invention, a specific said of a chemical oxygen generator, a flow regulator unit and a throttle unit is provided in the oxygen flow path from the chemical oxygen generator to the oxygen mask supplying oxygen to a person. This arrangement is configured in such a way that an elevated pressure is present in the flow path from the chemical oxygen generator to the throttle unit and all components included in said flow path. In particular, no pressure tank is present in line or in bypass of the oxygen flow path. The throttle unit preferably is a non-actuated nozzle having a small cross section effecting a significant increase in pressure on the upstream side and providing oxygen at a breathing pressure on its downstream side. The flow regulator unit is configured such that the pressure is controlled in a range which is sufficient to ensure a sufficient oxygen pressure at the oxygen mask after the oxygen has flown through the throttle unit. By this particular arrangement and configuration the whole flow path upstream of the throttle unit can be used for storing a significant amount of oxygen in case of excess oxygen production in the chemical oxygen generator. A major advantage of the oxygen breathing device according to the invention lies in the fact that neither additional storing volume like a pressure tank, an inflatable reservoir or the like are required for this storing of excess oxygen. Instead, a specific arrangement is used to increase the oxygen pressure level inside a major part of the oxygen flow path and thus the oxygen flow path itself is used for storing excess oxygen. In that this storage is made at an elevated pressure level induced by the throttle unit even a small volume provided by a said flow path is sufficient to store a significant oxygen mass.

As a further beneficial effect, the partial pressure of the oxygen in the oxygen generator is increased by the throttle unit thus leading to a slow-down of the chemical reaction inside the oxygen generator.

It is preferred to arrange the throttle unit as far as possible in the down stream direction of the flow path to increase the volume which is available for storing excess oxygen. Thus, it is in particular preferred to arrange said throttle unit in a position where a flexible hose is to be provided to connect the oxygen masks with the flow path whereby it is to be understood that the elevated pressure for storing the oxygen can not be applied to such flexible hose. It is further to be understood that the chemical oxygen generator and the flow regulator unit shall be designed in such a way that oxygen is produced at the elevated pressure. Thus, chemical oxygen generators and flow regulator units according to the prior art may not fit the requirements of the oxygen breathing device according to the invention.

The elevated pressure inside the upstream second line section maybe from 2-fold to 10-fold of the breathing pressure and the pressure inside the first line section may be even higher than said elevated pressure at the upstream second line section. To achieve an optimum balance of overall weight and oxygen capacity within the setup and control characteristics of the system it is preferred to operate the system at 10, 15 or 20 bar maximum operating pressure.

The throttle unit maybe a nozzle or a plurality of nozzles in a serial or a parallel arrangement. Generally, the throttle unit includes a constant reduction in flow cross section and is not adapted to be controlled or to be used as a pressure or flow control.

According to a first preferred embodiment the oxygen breathing device is improved by a safety valve arranged in an oxygen supply bypass line connecting said chemical oxygen generator with said at least one oxygen mask, wherein said oxygen bypass line is connected to said downstream second line section or said oxygen mask such that oxygen flowing from said chemical oxygen generator to said oxygen mask via said oxygen supply bypass line does not pass through said throttle unit, said safety valve being adapted to open flow through said oxygen supply bypass line if the pressure within the oxygen generator is above the pressure within the oxygen mask for a predetermined pressure difference limit and blocks oxygen flow from said oxygen generator to said oxygen mask if said pressure difference is below said pressure difference limit.

With this preferred embodiment a safety arrangement is provided for the event that the pressure inside the chemical oxygen generator exceeds a certain level as this could occur in case of failure of the flow control unit or in case of blockage of the throttle unit. In such failure oxygen will be provided to the passenger via the oxygen supply bypass line and the throttle unit and the oxygen flow unit will be bypassed in such case. This ensures a safe operation of the oxygen breathing device even in a fail situation of relevant parts and will at least provide oxygen to the passenger of the aircraft during a time period corresponding to the time of the chemical reaction inside the oxygen generator in a situation where no flow regulation and thus increased pressure is present inside the generator. Generally, it is to be understood that such oxygen bypass line maybe connecting the oxygen generator with the flow path behind the throttle unit but in a further preferred embodiment two such bypass lines maybe provided, wherein the first bypass line bypasses the flow regulator unit and the second bypass line bypasses the throttle unit. In such case, failure of either the flow regulator unit or the throttle unit maybe compensated by bypassing the failed unit but at the same time the function of the other unit is maintained and thus the time period for delivery of oxygen is increased.

Still further, the breathing device maybe further improved in that said chemical oxygen generator includes an internal volume having a size adapted to take up excess oxygen generated from said oxygen generator. With this embodiment, the oxygen generator itself maybe used as a storage device at an elevated pressure for excess oxygen.

Still further, it is preferred that said internal volume extends from the oxygen generator to the throttle unit and includes the flow regulator unit. In this embodiment, a maximum length and volume of the storage for excess oxygen is achieved.

According to a further preferred embodiment said chemical oxygen generator is adapted to produce sufficient oxygen for supplying the oxygen mask(s) connected to said flow regulator unit at a minimum cabin temperature and a maximum flight altitude in case of a decompression event of the cabin. According to this preferred embodiment, the chemical oxygen generator is configured such that under worst condition for the chemical reaction and maximum requirement for the delivery rate sufficient oxygen is present to supply a single or a plurality of persons using the oxygen mask(s) with oxygen.

Still further, it is preferred that said internal volume has a size corresponding to an excess oxygen volume at a predetermined pressure produced by said oxygen generator at a regular cabin temperature above said minimum cabin temperature and/or at a low emergency flight altitude. According to this preferred embodiment the need to blow of excess oxygen or to direct such oxygen via the bypass line to provide excess oxygen to the passenger is avoided by a specific setup and configuration of the volume in the flow path from oxygen generator to the throttle unit. This volume is calculated such that excess oxygen can be taken up in a condition where the aircraft is flying at a low flight altitude thus effecting a reduced oxygen consumption by the passenger and/or the cabin temperature is above said minimum cabin temperature thus increasing the chemical reaction within the oxygen generator.

Still further, it is preferred that said excess oxygen volume is calculated as a delivery rate of the oxygen generator minus an average consumption rate of passenger(s) using the oxygen mask(s) at regular cabin temperature and a flight level above 10000 feet supplied by said oxygen generator multiplicated with a supply time interval of at least 3 minutes preferably 15 minutes. Using such a configuration the aircraft oxygen breathing device will have a perfect fit to any emergency situation occurring in a civil aircraft under regular flight condition and thus, the supply time for oxygen will be significantly increased and adapted to fit to an initial high supply rate and a maximum supply time of, e.g., 2 hours. This allows to significantly reduce the weight of the emergency oxygen device without sacrificing the time period for delivering oxygen in an emergency situation.

Finally, it is preferred that said throttle unit is arranged in flow direction behind the flow regulator unit and in flow direction in front of a flexible hose connecting said oxygen mask with the flow regulator unit. Using such a configuration, the maximum volume in the flow path which is capable of bearing the elevated pressure for storing excess oxygen is included into the excess oxygen storage volume and only those parts of the flow path which will not be capable of being provided with such an elevated pressure is excluded from said storage volume.

A further aspect of the invention is a method of supplying oxygen to passenger of an aircraft in an emergency situation, comprising the steps of: generating oxygen in a chemical oxygen generator, supplying a first part of said oxygen via an oxygen supply line to an oxygen mask at a breathing pressure, wherein said method is improved in that a second part of said oxygen is stored at an elevated pressure above said breathing pressure in an internal volume including said chemical oxygen generator, a first section of said oxygen supply line, a flow control unit interconnected in said oxygen supply line and an upstream section of a second line section and said elevated pressure is induced by a throttle at the downstream end of the upstream section of a second line section.

The method may preferably be conducted with an aircraft oxygen emergency device as described before hand and the specific embodiments, preferences and advantages of said device are referenced with regard to the said method.

The method maybe further improved in that oxygen is supplied to the oxygen masks via a safety valve arranged in an oxygen supply bypass line, said safety valve being adapted to open flow through said oxygen supply bypass line if the pressure within the oxygen generator is above the pressure within the oxygen mask for a predetermined pressure difference limit and blocks oxygen flow from said oxygen generator to said oxygen mask if said pressure difference is below said pressure difference limit, wherein oxygen flowing from said chemical oxygen generator to said oxygen mask via said oxygen supply bypass line does not pass through said throttle unit.

Still further, it is preferred that said internal volume extends from the oxygen generator to the throttle unit and includes the flow regulator unit.

Still further, it is preferred that said chemical oxygen generator produces an oxygen flow rate sufficient for supplying oxygen to the oxygen mask(s) connected to said flow regulator unit at a minimum cabin temperature and a maximum flight altitude in case of a decompression event of the cabin.

Still further, it is preferred that said internal volume has a size corresponding to an excess oxygen volume at a predetermined pressure produced by said oxygen generator at a regular cabin temperature above said minimum cabin temperature and/or at a low emergency flight altitude.

Still further, it is preferred that said excess volume is defined as a delivery rate of the oxygen generator minus an average consumption rate of passenger(s) using the oxygen mask(s) at regular cabin temperature and a flight level above 10000 feet supplied by said oxygen generator multiplied with a supply time interval of at least 3 minutes up the maximum holding duration of, e.g. 2 hours, preferably 15 minutes.

Still further, it is preferred that method, wherein said method is improved in that said throttle unit is arranged in flow direction before a flexible hose connecting said oxygen mask with the flow regulator unit.

Three variations of a preferred embodiment of the invention is explained with referenced to the appending figures. In the figures:

DETAILED DESCRIPTION

Figure 1:
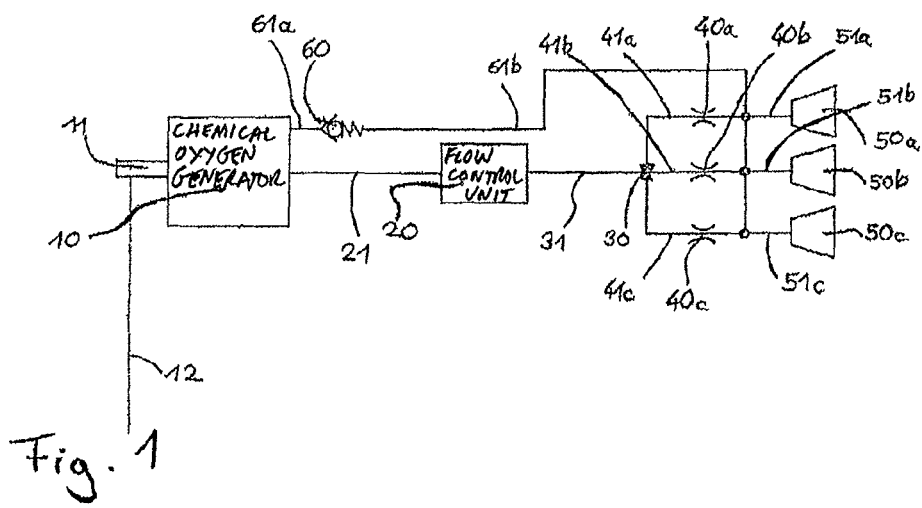
FIG. 1 shows a schematical setup of the emergency oxygen device.

In FIG. 1, a chemical oxygen generator 10 comprising a generator starter 11 is shown, wherein, said generator starter is connected via a signal line 12 to a control unit (not shown) adapted to activate said generator starter in case of an emergency situation.

A first line section 21 connects the chemical oxygen generator with a flow control unit 20. A first part 31 of a second line section connects said flow control unit with a manifold 30 connecting three second parts 41a-c of the second line section with the first part of the second line section. The three second parts 41a, b, c of the second line section end in corresponding three throttle units 40a-c. The throttle units 40a-c are flow restrictor orifices having a small flow cross section and thus effecting a significant throttle effect.

In downstream direction from the flow restrictor orifices 40a-c a third part 51a-c of the second line section connects the throttle units 40a-c with corresponding oxygen masks 50a-c.

As can be further seen from FIG. 1, a flow bypass line 61a is connected with the chemical oxygen generator 10 to connect said chemical oxygen generator with a safety valve 60. The safety valve 60 is a spring biased check valve adapted to open at a predetermined excess pressure inside the chemical oxygen generator. The safety valve 60 is connected via a downstream flow bypass line section 61b with the third parts 51a-c of the second line section. Thus, the flow bypass line comprising the first section 61a and second section 61b bypasses both the flow control unit 20 and the throttle units 40a-c and may thus provide oxygen to the passenger oxygen mask in case of failure of any of these devices or in case of excess pressure inside the first and/or second oxygen line section.

Figure 2:
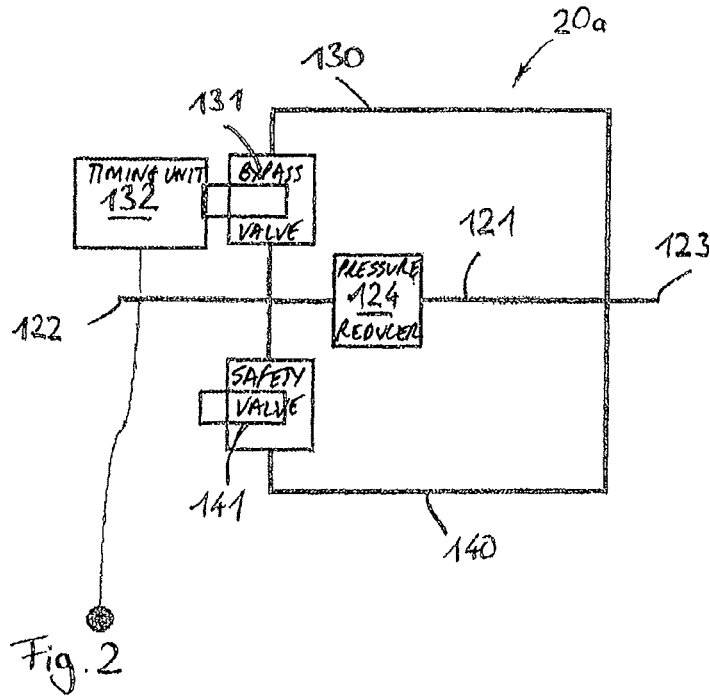
FIG. 2 shows a schematical setup of a first embodiment of the control unit in FIG. 1.
Figure 1A:
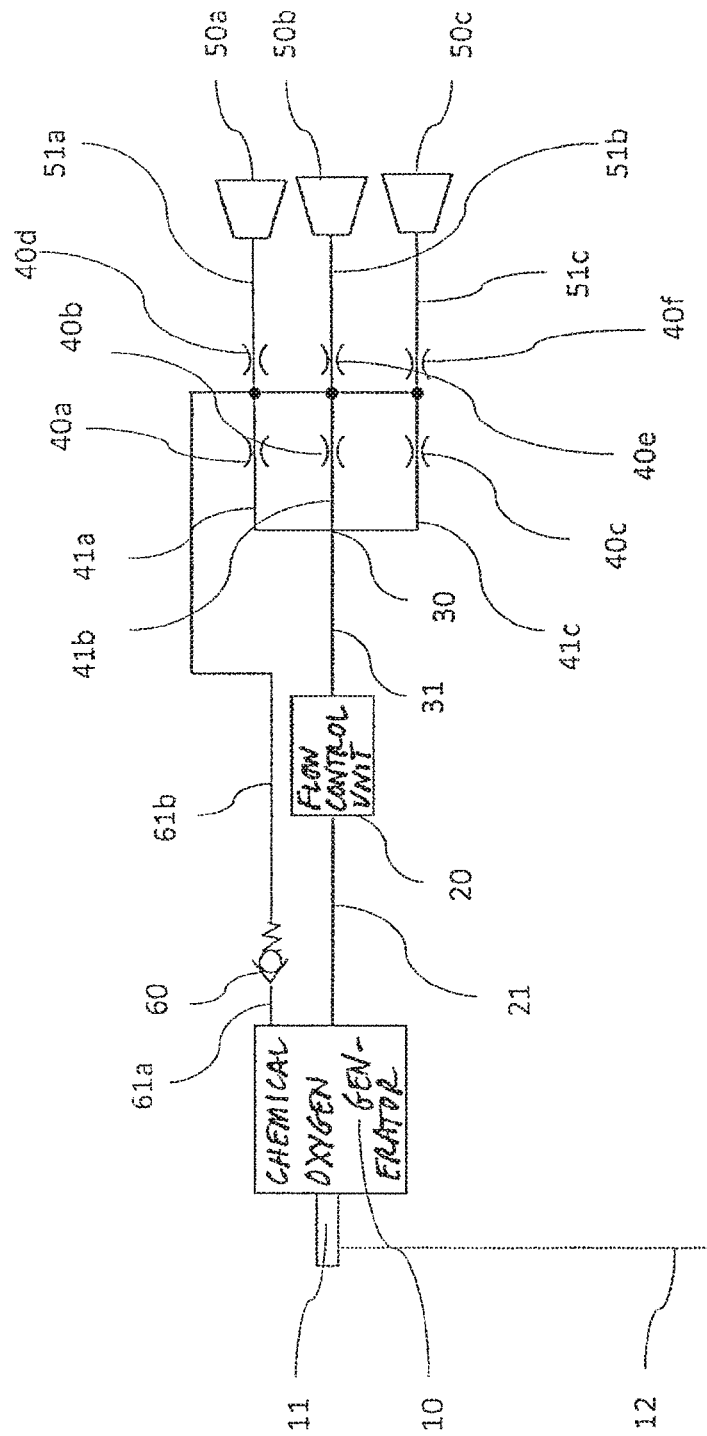
FIG. 1a shows an embodiment having a serial arrangement of nozzles 40a-f in the flow path to the oxygen masks 50a-c.
Figure 2A:
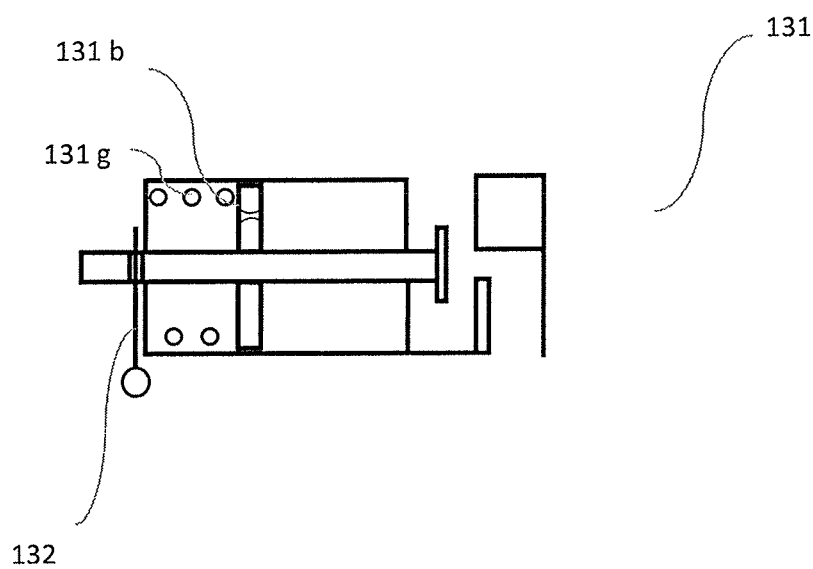
FIG. 2a shows an alternate embodiment in which timing unit 132 activates piston 131b acting as part of a by-pass valve 131, with piston 131b being loaded by spring 131g.

FIG. 2 shows a first embodiment 20a of the flow control unit 20 as shown in FIG. 1. This first embodiment control unit 20a comprises a central oxygen line 121 connecting the inlet opening 122 of the control unit 20a with the outlet opening 123. Generally, it is to be understood that the inlet opening 122 is directly connected to the oxygen generator whereas the outlet opening 123 is directly connected to the throttle units 40a-c.

Further, the control unit 20a comprises a first bypass oxygen line 130 which is arranged in parallel to the central oxygen line 121 and connects the inlet opening 122 with the outlet opening 123. In the first bypass line 130 a bypass valve 131 is arranged which is coupled to a timing unit 132. The timing unit 132 may be a mechanical or electrical timer activating a spring loaded or pneumatic or hydraulic piston. The timer is configured such that the bypass valve 131 is kept open for a predetermined time, e.g. 3.5 minutes, after activation of the whole emergency oxygen device. By this, a high throughput of oxygen is achieved in the first phase of the emergency situation wherein in this first phase usually the plane is at a high flight altitude level and makes an emergency descent to a low altitude. In this phase, the passengers will require a high amount of oxygen to be delivered from the emergency oxygen device. Usually after a few minutes the plane arrives at a low flight level and then oxygen consumption by the passengers is significantly reduced. In this situation the bypass valve is shut and the oxygen supply is controlled by a pressure reducer 124 in the central oxygen line 121.

Still further, a second bypass line 140 is provided comprising a safety valve 141. The second bypass line 140 will allow to bypass both the central oxygen line 121 and the first bypass line 130 in case of failure of the pressure reducer 124 and/or the bypass valve 131 to make sure that oxygen is always allowed to flow through the control unit 20a.

It is to be understood that the timing unit 132 is coupled for signal transmission to an electrical or mechanical activation unit which at the same time is responsible for starting the chemical reaction in the chemical oxygen generator to allow simultaneous start of the timing procedure.

Figure 3:
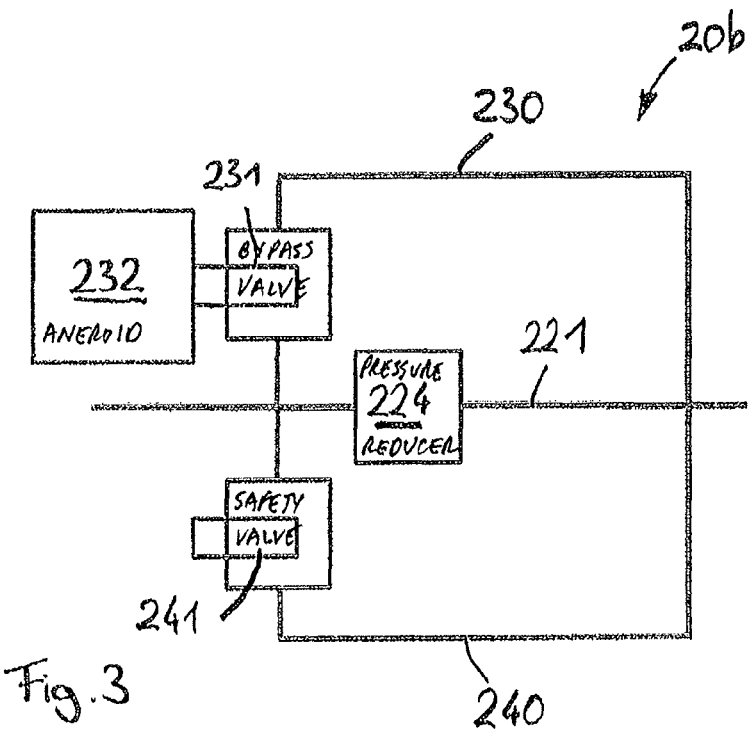
FIG. 3 shows a schematical setup of a second embodiment of the control unit in FIG. 1.

FIG. 3 shows a second embodiment control unit 20b as an alternative to the control unit 20 in FIG. 1. In this second embodiment, a central oxygen line 221, a first bypass line 230 and a second bypass line 240 is provided including a bypass valve 231 and a safety valve 241 in the first and second bypass line, respectively, corresponding to the embodiment shown in FIG. 2.

The embodiment shown in FIG. 3 differs from the embodiment shown in FIG. 2 in that instead of a timing unit associated with the bypass valve 231 in the second embodiment of FIG. 3 an aneroid 232 is provided which is coupled to the bypass valve 231. The aneroid 232 is configured to detect the ambient pressure and to control the bypass valve 231 depending on said ambient pressure inside the cabin of the aircraft or outside of the aircraft. It is to be understood that the bypass valve may thus be either completely shut or completely open under control of the aneroid in order to allow no flow of oxygen through the bypass line 230 or to allow a full flow of oxygen through the bypass line 230 at high altitude.

Figure 4:
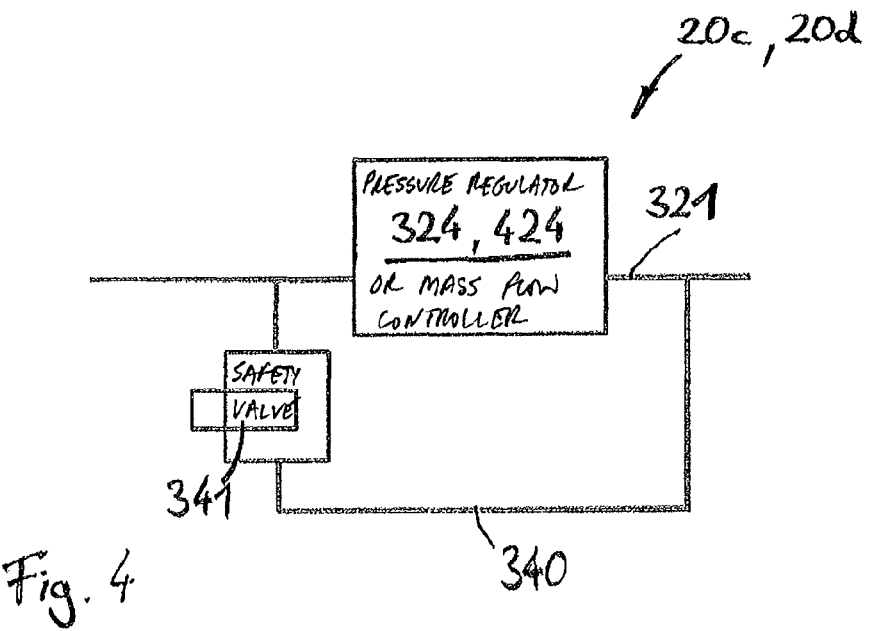
FIG. 4 shows a schematical setup of a third embodiment of the control unit in FIG. 1.

FIG. 4 shows a third embodiment 20c of the control unit 20 shown in FIG. 1. In this third embodiment, a second bypass line 340 comprising a safety valve 341 is provided corresponding to the first and second embodiment shown in FIG. 2, 3.

The third embodiment shown in FIG. 4 differs from the embodiments shown in FIG. 2, 3 in that the central oxygen line and the first bypass line are integrated into one main oxygen line 321. This main oxygen line 321 comprises a mechanically or electrically actuated pressure regulator incorporating an altitude control. By this implementation, the fully open or fully closed condition of the bypass valve 231 according to the second embodiment shown in FIG. 3 is included in the pressure reducer 224 of FIG. 3 in a single, integrated unit 324 in the third embodiment of FIG. 4. This integrated pressure regulator 324 allows the fully open condition for a maximum oxygen flow at high altitude, controlled by an altitude control via a mechanical or electrical actuation of a valve and a partially open condition of the same valve in flight conditions at lower altitude or only partial decompression situations. It is to be understood that the altitude control may be achieved by a pressure sensor detecting the inside pressure in the cabin or the outside pressure outside of the cabin wherein the latter corresponds to the altitude of the aircraft. The integrated pressure regulator 324 may even receive signals from other altitude detecting sensors of the aircraft system.

Finally, it is to be understood that in a third embodiment shown in FIG. 4 may be changed such instead of the pressure regulator 324 of the third embodiment an electrical mass flow controller 424 is included in the main oxygen line 421 of this embodiment. Said electrical mass flow controller is able to precisely control the mass flow of oxygen depending on an altitude signal or a pressure signal or both from the oxygen generator to the throttles 40a-c before the oxygen masks.

The invention claimed is:

1. Aircraft emergency oxygen system comprising:
   a. a chemical oxygen generator configured to produce a stream of oxygen at a first pressure;
   b. a flow control unit in fluid communication with and downstream of the chemical oxygen generator;
   c. a manifold in fluid communication with and downstream of the flow control unit;
   d. a throttle unit (i) in fluid communication with and downstream of the manifold and (ii) having a cross-section configured to increase pressure of the stream of oxygen at least in the flow control unit and the manifold to above the first pressure;
   e. an oxygen mask in fluid communication with and downstream of the throttle unit;
   f. a bypass flow line (i) extending between the chemical oxygen generator and the oxygen mask, (ii) commencing upstream of the manifold, (iii) terminating downstream of both the manifold and the throttle unit, and (iv) not passing through the manifold or the throttle unit; and
   g. a safety valve (i) arranged in the bypass flow line and (ii) configured to allow fluid flow therethrough as a function of a pressure difference between the oxygen generator and the oxygen mask.

2. Aircraft emergency oxygen system according to claim 1 in which the chemical oxygen generator includes an internal volume having a size adapted to receive excess oxygen generated by the chemical oxygen generator.

3. Aircraft emergency oxygen system according to claim 2 in which the chemical oxygen generator is adapted to produce oxygen for supplying the oxygen mask at a minimum cabin temperature and a maximum flight altitude in case of a decompression event of a cabin of an aircraft in which it is located.

4. Aircraft emergency oxygen system according to claim 3 in which the internal volume has a corresponding to an excess oxygen volume at a predetermined pressure produced by the chemical oxygen generator (a) at a regular cabin temperature above the minimum cabin temperature, (b) at a low emergency flight altitude of the aircraft, or (c) both at the regular cabin temperature above the minimum cabin temperature and at the low emergency flight altitude.

5. Aircraft emergency oxygen system according to claim 1 in which (a) the fluid communication between the flow control unit and the chemical oxygen generator, the manifold and the flow control unit, and the throttle unit and the manifold defines a main flow line, (b) the main flow line is configured to store excess oxygen generated by the chemical oxygen generator, and (c) no pressure tank is present in either the main flow line or the bypass flow line.

6. Aircraft emergency oxygen system according to claim 1 in which the throttle unit comprises a non-actuated nozzle.

7. Aircraft emergency oxygen system according to claim 1 in which the throttle unit comprises a plurality of nozzles in a serial arrangement.

8. Aircraft emergency oxygen system according to claim 1 in which the throttle unit comprises a plurality of nozzles in a parallel arrangement.

9. Aircraft emergency oxygen system according to claim 1 in which the flow control unit comprises a timing unit.

10. Aircraft emergency oxygen system according to claim 9 in which the flow control unit further comprises (a) a bypass valve coupled to the timing unit and (b) a piston activated by the timing unit.

11. Aircraft emergency oxygen system according to claim 9 in which the timing unit comprises a mechanical or electrical timer.

12. Aircraft emergency oxygen system according to claim 10 in which the piston is selected from the group consisting of spring-loaded pistons, pneumatic pistons, and hydraulic pistons.

13. Aircraft emergency oxygen system according to claim 10 in which the timing unit is configured such that the bypass valve remains open for a predetermined time after activation of the chemical oxygen generator.

14. Aircraft emergency oxygen system according to claim 13 in which the predetermined time is approximately 3.5 minutes.

15. Aircraft emergency oxygen system according to claim 1 further comprising a plurality of oxygen masks.

16. Aircraft emergency oxygen system according to claim 15 further comprising a plurality of throttle units.

17. Aircraft emergency oxygen system according to claim 16 in which each of the plurality of oxygen masks is in fluid communication with and downstream of one of the plurality of throttle units.

* * * * *